United States Patent [19]
Mertens

[11] 3,760,753
[45] Sept. 25, 1973

[54] FLOATABLE-SUBMERSIBLE VESSEL CONTAINER

[75] Inventor: Johann Mertens, Santa Cruz, Calif.

[73] Assignee: Nuclear Waste Systems Company, Campbell, Calif.

[22] Filed: Apr. 15, 1971

[21] Appl. No.: 134,185

[52] U.S. Cl. ............................. 114/0.5 T, 114/16 E
[51] Int. Cl. ........................ B63g 8/22, B63b 35/00
[58] Field of Search ..................... 114/0.5 T, 0.5 R, 114/74 T, 74 R

[56] References Cited
UNITED STATES PATENTS
1,201,051 10/1916 Jack ................................. 114/0.5 T
3,630,161 12/1971 Georgii ............................ 114/0.5 T Primary Examiner—Duane A. Reger
Assistant Examiner—Charles E. Frankfort
Attorney—Jack M. Wiseman

[57] ABSTRACT

A sealed floatable, submersible vessel container for carrying contaminant waste materials to sea, said container providing pressure equalization while sinking.

12 Claims, 9 Drawing Figures

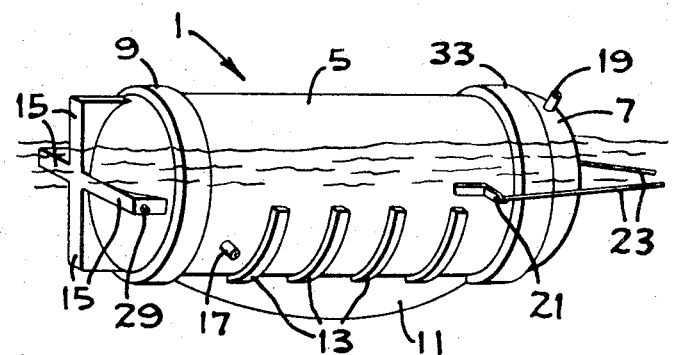
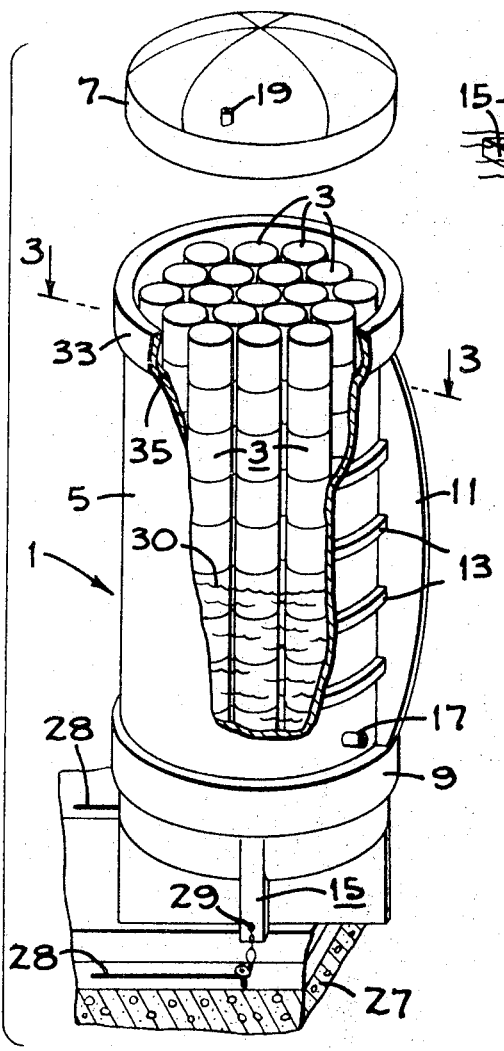
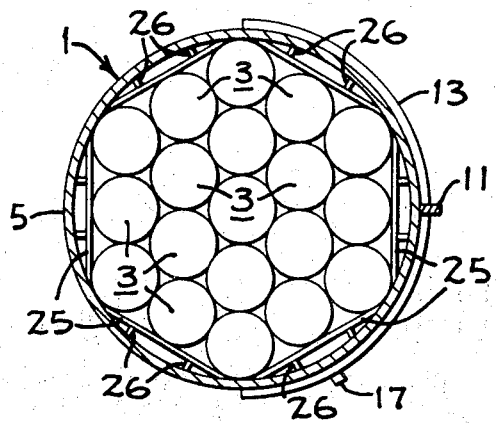
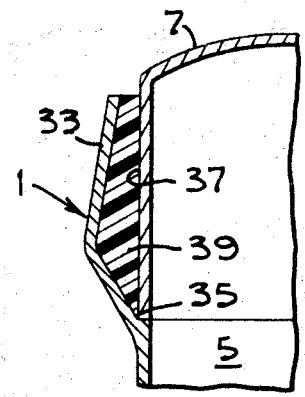
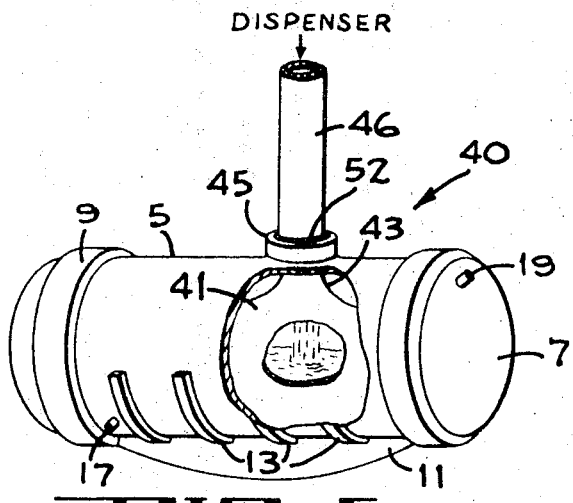
INVENTOR.
JOHANN MERTENS
BY Jack M. Wiseman
ATTORNEY

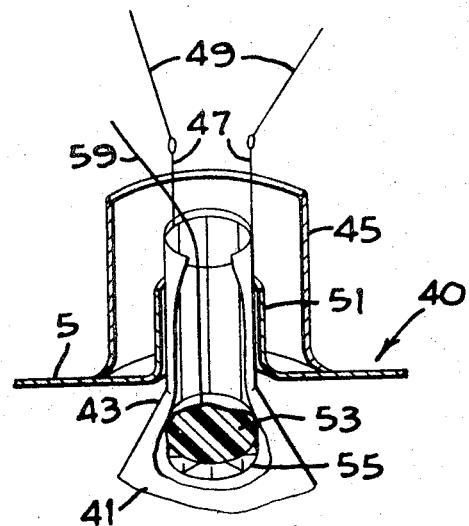
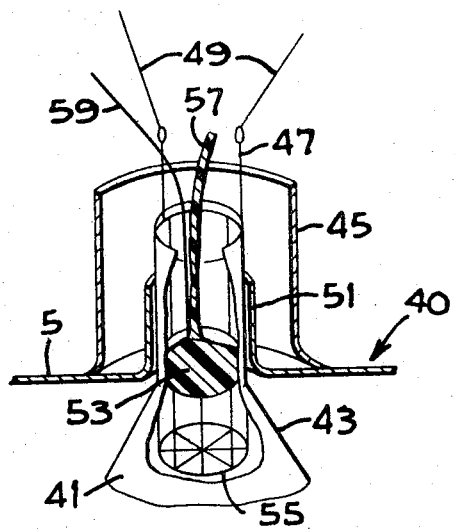
FIG_6A
FIG_6B
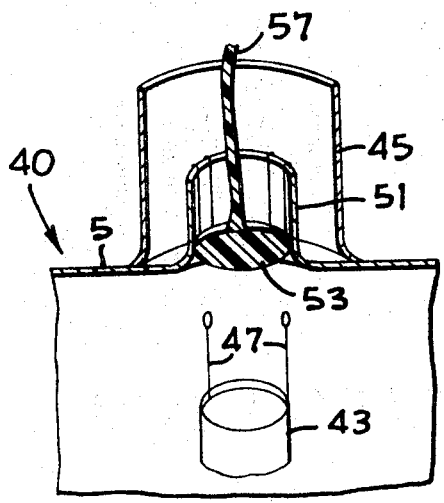
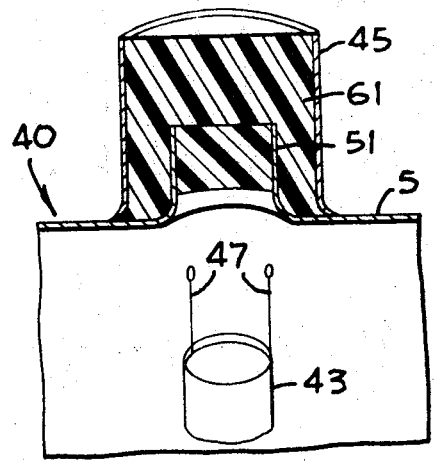
FIG_6C
FIG_6D

FLOATABLE-SUBMERSIBLE VESSEL CONTAINER

BACKGROUND OF THE INVENTION

The present invention relates to the disposal or storage in the sea of contaminant waste materials without danger of polluting the sea. For example, industrial nuclear power plants require a means of disposing of radioactive waste. A prime concern associated with the disposal or long time storage of radioactive waste in the sea is the hazard of pollution. The deep sea is well suited for depositing radioactive waste containers, primarily because mixing and movements at great depths, e.g., 1,000 meters or greater, is not intense. However, heretofore, corrosion of containers by the sea water has been of prime concern. Corrosion and collapse of containers at such depths causes the contained radioactive waste to disperse in the sea water, first horizontally over a large area and eventually upward, thereby contaminating large expenses of the sea.

SUMMARY OF THE INVENTION

A vessel container which may be used for storing contaminants, such as radioactive waste material. The container is adapted to float on the sea surface while carrying large volumes of contaminant material. The container can be towed to sea for sinking. It is further adapted to provide for pressure equalization while sinking. The vessel may also be adapted for subsequent retrieval, if desired.

An exemplary embodiment comprises a cylindrical shell with end covers all constructed of ferro-cement or other suitable material for sealing radiation from the contaminant material. The shell carries a keel and reinforcing ribs. Depending on the mode of filling, the container may include stand-up supports carried by one of the end covers for vertical support of the container. A combination flood and check valve and a combination vent and check valve provide for connection to an umbilical cord. Thus, sea water may enter the flood valve to fill the container such that the container sinks. A corrosive member holds the valves open for a predetermined time until the members have eroded, thereby closing the valves. The valves now serve as check valves. As the vessel continues to sink, the pressure differential between outside and inside opens the check valves, thus equalizing the pressure in the drum.

BRIEF DESCRIPTION OF THE DRAWINGS

FIG. 1 is a fragmentary perspective view of a container embodying the present invention; and shown resting on a loading dock in the vertical position;

FIG. 2 is a perspective view of the container of FIG. 1 in floating position;

FIG. 3 is a cross-sectional view of the container taken along line 3—3 of FIG. 1;

FIG. 4 is a fragmentary section view showing the mating and sealing of the cover to the shell of the container of FIG. 1;

FIG. 5 illustrates a modification of the container of the present invention for loading contaminants in bulk with the container resting in the horizontal position; and FIG. 6a–6d illustrate structure and method of sealing the inlet throat of the container of FIG. 5.

DESCRIPTION OF THE PREFERRED EMBODIMENT

FIGS. 1–4 illustrate a container 1 of the present invention, which is arranged to carry individual stack waste containers 3, e.g. 55 gallon drums commonly used in industrial nuclear power plants for directly containing radioactive waste materials. As such, the drums 3 serve as a primary containment and the container 1 serves as a secondary vessel for disposing of or storing contaminants. The container 1 comprises a cylindrical shell 5 with end covers 7 and 9 at opposite ends. The shell 5 and covers 7 and 9 may all be constructed of ferro-cement or other suitable construction materials for sealing radiation from the contaminant material. The cover 7 serves as a primary portal means for receiving the waste material to be disposed of or stored. In this embodiment, the material within the drums 3 which are received through the end with the cover 7 removed. Extending parallel to the longitudinal axis of the shell 5 is a keel member 11. Surrounding the outer periphery of the shell and concentric therewith are circular reinforcing ribs 13. The ribs 13 may be either on the interior or exterior of the shell. The container 1 further includes a standup support in the form of quadrature spaced arms 15 forming a flat surface on one side and a cradle on the other side coinciding with the structure of the end cover 9. Along the side of the shell 5 is a combination flood and check valve 17 and on the cover 7 is a combination vent and check valve 19. The valve 17 is such that it allows flow only into the vessel-container. The container further carries tow lugs 21 to be engaged by tow lines 23 of a tug boat.

As illustrated in FIG. 3, the interior of the shell 5 may carry supporting members 25 joined together in the form of a hexagon with normal support studs 26 intermediate the shell 5. The individual drums 3 are positioned in rows within the container by means of cranes. Though not shown, a suitable spacer is included on top of each stack row such that the check valve carried by each of the drums 3 is free. As shown in FIG. 1, the container 1 may be positioned in a vertical upright position with the stand-up support base 15 securing the container in set position on a loading dock platform 27. Accordingly, the container 1 may be secured to the platform 27 by pulley cables 28 secured to anchors 29 on the support base 15 to retain its vertical position while being loaded. The loading process will undoubtedly take place in a dry-dock type vault which is readily accessible to a water channel opening to the sea. The interior and exterior of the vessel container 1 may be coated with neoprene to provide sealing and long lasting resistance to salt water.

After the last stack of drums 3 have been put in place, a quantity of inhibited water 30 is put into the container 1. The amount of inhibited water 30 is selected such that the container vessel 1 is nearly submerged when floated as indicated in FIG. 2. Inhibited water is used as it tends to retard erosion of the drums. The top cover 7 is then mated and bonded to the cylindrical shell 5 as illustrated in FIG. 4. As shown, the shell carries a rib 33. The rib 33 joins the end of the shell 5 at a junction 35 common to the end of the top cover 7. The rib 33 and the edge of the top cover 7 forms a well 37 in which a suitable bonding agent 39, e.g. an epoxy resin, is poured. This may be realized through use of a crane supporting a large ladle from which the resin is poured. This bonding agent 39 cures in the form of a wedge shaped joint adding to the strength and reliability of the joint once the bonding material is cured.

After the end cover 7 is secured, the container 1 is ready to be maneuvered out of its loading position on the platform 27 and placed into a channel of water leading to the sea. Accordingly, the vessel 1 is lowered to its horizontal position ino the water and tugged by a boat connected to the cables 23 as shown in FIG.2. The lowering process may include flooding the vault within which the platform 27 appears. The cables 28 are released. The keel 11 causes the vessel-container to move forward and with a crane supporting the upper end of the container 1, the container is slowly lowered into the horizontal position. It may also be recognized that in view of the fact that the inhibited water 30 has been included so as to nearly submerge the container 1, the container may be maneuvered manually since the hazard of radiation has been minimized through submergence of the tank 1. The towing cables 23 and an umbilical cord are then taken aboard a tugboat.

After having been towed to the destination point, the flood valve 17 and the vent valve 19 are actuated through an umbilical cord. The container 1 is then released from the tugboat by releasing the cables 23. As sea water enters the container 1 through the flood valve 17, the inside of the container is filled and the vessel container 1 steadily sinks. After a predetermined time sufficient to allow flooding of the container 1, a corrosive member holding open the flood-check valve 17 and the vent-check valve 19 will have eroded such that both valves close and now function as check valves. As the vessel-container 1 continues to sink, the pressure differential between the outside and the inside of the container opens the check valves equalizing the pressure on the inside and outside. As a result, pressure equalization is realized to any depth thereby inhibiting implosion of the vessel-container 1.

FIG. 5 illustrates an embodiment of the present invention adapted to handle in bulk contaminated waste material. There is depicted a vessel container referred to by the general reference character 40 which provides the desirable feature of primary and secondary containment. Those elements of the vessel container 40 common to the vessel container 1 of the FIGS. 1–4 carry the same reference numerals. The container 40 carriers within its interior a large individual container in the form of a bag 41 serving as the primary containment. The bag 41 encompasses the waste material and is made of a material of radiation resistant material. The bag 41 carries a conical-shaped throat 43 which protrudes from the container 5 through a primary portal means or port 45 adapted for receiving a discharge pipe 46 of a dispenser (not shown).

Viewing FIGS. 6a and 6b it will be noted that the throat 43 carries a pair of hoock members 47 which extend through the port 45. The hooks 47 are adapted to engage cable means 49 so as to support the throat 43 during the filling operation. On the interior of the port 45 is a collar 51 through which the throat 43 extends when secured by the hooks 47. Accordingly, in the filling process the discharge tube 46 may be engaged within the port 45 with a temporary sealant 52 intermediate the outer periphery of the tube 43 and internal periphery of the port 45. Within the bag 41 there is a ball 53 within a cage 55. As the bag 41 is filled with waste material, the ball 53 and the cage 55 rise towards the opening through the throat 43. After the ball 53 begins to rise in the cage 55, a bonding agent may be poured into the throat 43. This lifts the ball 53 further. The diameter of the ball is selected to exceed the minimum diameter of the conical-shaped throat 43. Thus the ball assumes a tight engagement with the throat 43 and the cage 55 due to the conical shape. Now the space within the throat 43 above the ball 53 is filled with a bonding agent 57 as shown in FIG. 6c. To assure that the ball 55 rises adequately, a string 59 may be fastened to the ball and pulled tightly after the bonding agent 57 has been poured. After the bonding agent has cured, the cables 49 are released and the throat 43 of the bag 41 drops into the interior of the vessel 5. At this time, there is an opening through the port 45. As shown in FIG. 6c and 6d, the port 45 is sealed by a bonding agent 61 similar to that of the sealing agent 52. The agent is poured within the intricacies of the collar 51 and the port 45 until it is filled as shown in FIG. 6d, thereby sealing the container 5. The container may now be maneuvered into the water channel for transport.

If retrieval of the vessel container 5 is desired, a buoy with lifting cables attached thereto may be secured to the vessel. To facilitate location, a long life emitter may be attached to either the buoy or to the vessel. To provide for pressure equalization during ascent, waste container inside the vessel are equipped with bellows, primed with water before descent. Two check valves having opposite flow direction interconnect the inside of the vessel with the bellows. The bellows with check valves are in addition to the check valves on the vessel and on the containers it carries. As the vessel container 1 rises, water flows from inside container into the respective bellows, thereby equalizing pressure and containing all fluids to the confines of the primary and secondary containments, and thereby eliminating the likelihood of any of the waste material escaping from the vessel-container 1.

I claim:

1. A vessel-container for storing or disposing of materials in the sea, the vessel-container comprising, in combination:

a shell member;

a pair of end covers adapted for sealing to opposing ends of the shell member to form an enclosure;

a keel member supported by said shell member;

primary portal means within the shell member for receiving material;

flood valve means for passing water to the interior of the shell for flooding said enclosure;

vent valve means for venting said enclosure and leading between the interior and exterior of the enclosure; and check valve means for equalizing the pressure between the interior and exterior of said enclosure after being submerged.

2. The vessel-container of claim 1 and further including primary containment means positioned within said enclosure and in which said material is directly contained.

3. The vessel-container of claim 2 in which the primary containment means is in the form of a large individual container within said enclosure, the container including primary portal means for receiving the material in bulk.

4. The vessel-container of claim 2 in which the primary containment is in the form of a bag of a radiation resistant membrane material and having a throat member adapted for receiving said material through the primary portal means.

5. The vessel-container of claim 4 in which the throat member is of conical shape; and in which a floatable sealant member is supported within the membrane, the member having a maximum diameter exceeding the minimum diameter of the throat such that as the membrane is filled with said material, the sealant member is wedged within the throat to seal the throat.

6. The vessel-container of claim 5 and further including basket means supported adjacent the throat of the membrane and enclosing the sealant member, the member floating within said basket responsive to the level of said material within said enclosure.

7. A vessel-container for storing or disposing of materials in the sea, the vessel-container comprising, in combination:
   a shell member;
   a pair of end covers adapted for sealing to opposing ends of the shell member to form an enclosure;
   a keel member supported by said shell member;
   primary portal means within the shell member for receiving material;
   flood valve means for passing water to the interior of the shell for flooding said enclosure;
   vent valve means for venting said enclosure and disposed between the interior and exterior of said enclosure;
   check valve means for equalizing the pressure between the interior and exterior of said enclosure after being submerged; and
   primary containment means positioned within said enclosure for containing said material, said primary containment means being in the form of individual drums, each of said drums storing respectively said material.

8. The vessel-container of claim 7 in which the shell member and the end covers comprise radiation resistant material.

9. The vessel-container of claim 7 and further including a stand-up support base joined to one of the end covers and securing the shell in a vertical position; and in which the other end cover is removable from the shell to form the primary portal means through which the individual drums are received.

10. The vessel-container of claim 7 in which the flood valve means and vent valve means comprise corrosive member means for holding the flood valve means and vent valve means open, the corrosive member being responsive to sea salt water within said enclosure thereby eroding to close the valves.

11. A vessel-container as claimed in claim 7 wherein said drums are disposed in said enclosure with the axes thereof in parallel relation.

12. A vessel-container as claimed in claim 7 wherein said shell member is of a configuration to include an axis and wherein said drums are disposed in said enclosure with the axes thereof parallel to the axis of said shell.

* * * * *